United States Patent
Robinson et al.

(10) Patent No.: US 9,594,918 B1
(45) Date of Patent: Mar. 14, 2017

(54) COMPUTER DATA PROTECTION USING TUNABLE KEY DERIVATION FUNCTION

(71) Applicant: EMC Corporation, Hopkinton, MA (US)

(72) Inventors: Peter Alan Robinson, Enoggera Reservoir (AU); Sean Parkinson, Indooroopilly (AU); Eric Young, Annerley (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 14/572,027

(22) Filed: Dec. 16, 2014

(51) Int. Cl.
G06F 11/30 (2006.01)
G06F 21/62 (2013.01)
H04L 9/08 (2006.01)

(52) U.S. Cl.
CPC .......... *G06F 21/62* (2013.01); *G06F 21/6209* (2013.01); *H04L 9/0863* (2013.01)

(58) Field of Classification Search
CPC ... G06F 21/62; H04L 2209/80; H04L 9/0838; H04L 9/0861; H04L 9/0863; H04L 9/0869
USPC .......................................................... 713/193
See application file for complete search history.

(56) References Cited

U.S. PATENT DOCUMENTS

| | | | | |
|---|---|---|---|---|
| 8,254,571 | B1 * | 8/2012 | Boyen | H04L 9/0863 380/252 |
| 8,788,842 | B2 * | 7/2014 | Brouwer | H04L 9/0838 380/44 |
| 8,897,450 | B2 * | 11/2014 | Scarisbrick | H04L 9/0863 380/277 |
| 9,288,047 | B2 * | 3/2016 | Brouwer | H04L 9/0838 |
| 2011/0252243 | A1 * | 10/2011 | Brouwer | H04L 9/0838 713/189 |
| 2014/0281574 | A1 * | 9/2014 | Webb | G06F 21/74 713/189 |
| 2015/0006907 | A1 * | 1/2015 | Brouwer | H04L 9/0838 713/189 |

(Continued)

OTHER PUBLICATIONS

"PBKDF2", (https://en.wikipedia.org/w/index.php?title=PBKDF2&oldid=633787627) Nov. 14, 2014, Wikipedia, Retrieved Oct. 26, 2015, 4 pages.

(Continued)

*Primary Examiner* — Samson Lemma
(74) *Attorney, Agent, or Firm* — BainwoodHuang

(57) ABSTRACT

A computer-implemented method of protecting digital data includes applying a key derivation function to a first value to generate a first derived key, the first value being equal to or derived from a first input password. The first derived key is combined with the digital data to generate a protected record stored in the computer. Subsequently, the key derivation function is applied to a second value to generate a second derived key, the second value being equal to or derived from a second input password. The protected record is processed using the second derived key to permit access to the digital data when the second derived key matches the first derived key. The key derivation function includes iterations of a two-stage hashing operation creating and using an array of memory blocks whose size is specified independently of the number of iterations to decouple processing and memory requirements.

19 Claims, 8 Drawing Sheets

(56) References Cited

U.S. PATENT DOCUMENTS

2015/0324789 A1* 11/2015 Dvorak .............. G06Q 20/3678
705/67

OTHER PUBLICATIONS

"Scrypt" (https://en.wikipedia.org/w/index.php?title=Scrypt&oldid=629101244) Oct. 10, 2014, Wikipedia, Retrieved Oct. 26, 2015, 5 pages.

* cited by examiner

COMPUTER DATA PROTECTION USING TUNABLE KEY DERIVATION FUNCTION

BACKGROUND

The invention is related to the field of computer security.

Computers employ a technique called "password hashing" in their security mechanisms that protect the computer and the data it stores from proper access and use. At its most basic, password hashing involved applying a hash function to a user's password or other secret value to generate a hash value that is stored and used in the computer rather than the user's password. The hash function has a "one-way" characteristic, in the sense that there is no corresponding discrete inverse function that can be applied to the hash value to recover the password. Thus, use of password hashing in a computer can enhance security, because of the reduced risk of a user password being compromised and used for an improper purpose, such as unauthorized access to stored data.

SUMMARY

One of the challenges of protecting passwords by password hashing is that in a given context there may be a quite limited number of passwords that could possibly be used. It may be relatively easy for an attacker to use a "brute force" technique of executing the password hashing function for all potential passwords until the password that yields the known hash value is encountered. This computation is susceptible of parallel processing, so attackers can decrease the time required for an attack by deploying more processing resources.

Password-based key derivation functions have been developed that intentionally require high amounts of memory and processing, both increasing the cost of a brute force attack and decreasing its chance of succeeding. In one technique, a password is used to initiate a repeated hashing operation that generates a large array of memory blocks containing pseudo random data based on the password, and then additional hashing operations are performed using the memory blocks to arrive at the hash output value, which is referred to as a "derived key". The additional hashing begins with the last-created memory block in the array, so that it is required that the entire array be created and be present in the memory throughout operation, yielding the desired consumption of memory and processing resources (i.e., CPU time). As the required memory and/or processing resources are increased, the resources required by an attacker to be successful are also increased.

Known password-based key derivation functions have certain undesirable shortcomings. One is that they are parameterized in a way that the memory consumption and processing time are dependent on each other. In particular, the number of hashing operations performed on the memory array is generally about equal to the number of blocks in the memory array. If in a given application it is desired that the function be calculated quickly for normal system performance reasons, then less memory is also used, and the strength of the protection provided by the function is diminished. Another significant issue is the inability to upgrade protection without having access to the original password. When a system is first deployed, acceptable protection may be provided by using a certain amount of memory and/or processing, but over time this protection diminishes as memory density and processing power grow—a determined attacker can economically deploy enough computing power to make a brute force attack successful. It would be ideal to be able to generate new hash output values by increasing the memory and processing requirements for the hashing operation. However, in general this would require access to the source passwords from which the existing derived keys were derived, and this may not be feasible or practical in many applications.

Methods and apparatus are disclosed that address the above and other shortcomings in the use of password-based key derivation functions for computer security. In particular, a disclosed technique provides for decoupling processing time from memory requirements, so that better tradeoffs can be made to balance performance of normal use against protection strength as provided by high memory requirements. Also, the disclosed technique enables a later increasing of protection strength by executing additional hashing operations on existing hash values created at an earlier time from source passwords. This feature gives flexibility to system administrators to tune the protection strength over time without requiring access to the source passwords.

In particular, a method is disclosed of operating a computer to protect digital data stored therein. The method includes, in a first operation, receiving a first input password and applying a key derivation function to a first value of a function input to generate a first derived key as a first value of a function output. The first value of the function input is equal to or derived from the first input password. The first derived key is combined with the digital data to generate a protected record stored in the computer. Specific examples of protected records described herein include encrypted files and account records used to authentication users of a computer system. The first password can be thought of as the "correct" password, assuming that the user providing the password is an authorized user performing an authorized operation.

The method further includes, in a subsequent second operation, receiving a second input password and applying the key derivation function to a second value of the function input to generate a second derived key as a second value of the function output, where the second value of the function input is equal to or derived from the second input password. The protected record is processed using the second derived key to selectively permit user access to the digital data when the second derived key matches the first derived key. The second password can be thought of as a "proffered" password, i.e., a password supplied when a user is trying use or access the protected record. In the normal case, the user is the same authorized user and the second password is the same as the first password. If the derived keys do not match, it indicates that the attempted access may not be authorized, so typically access is not granted.

Applying the key derivation function includes performing a first predetermined number of iterations of a two-stage core hashing operation. A first stage includes creating an ordered array of initialized memory blocks by recursive block hashing and saving beginning with a first memory block created by first hashing of a core input value, the ordered array including a last-created memory block and having a size equal to a second predetermined number of memory blocks. A second state of the core hashing operation includes creating a core output value by recursive block selecting and block hashing beginning with the last-created memory block, where successive recursions select from among blocks of the ordered array of initialized memory blocks according to contents of respective hashed block results of respective immediately preceding recursions. The iterations of the two-stage core hashing operation include (1)

a first iteration with the function input being taken as the core input value, (2) a last iteration with the core output value being taken as the function output, and (3) one or more intermediate iterations with the core input value being the core output value from a respective immediately preceding iteration and the core output value being the core input value to a respective immediately succeeding iteration.

The use of separate predetermined first and second numbers specifying a number of iterations and a number of memory blocks respectively effects a desired decoupling between the amount of processing required and the amount of memory required. One can be changed without necessarily changing the other. The technique thus provides tunability that can be used to balance performance against protection strength and to enable system administrators to increase protection strength over time without requiring access to source passwords, among other benefits.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
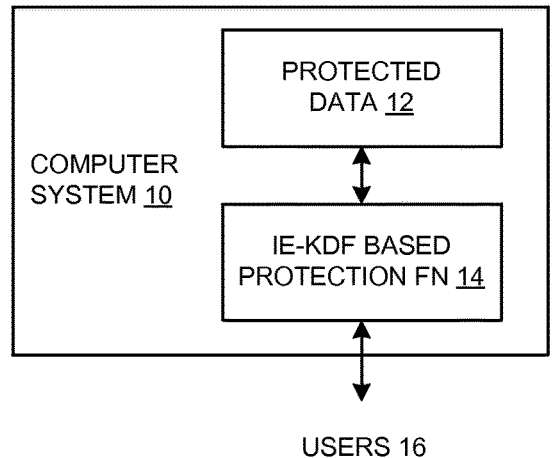
FIG. 1 is a functional block diagram of a computer.

FIG. 1 shows a computer system 10 including data identified as protected data 12 and a protection function 14 based on an iteration-enhanced key derivation function (IE-KDF). The IE-KDF based protection function 14 is interposed between the protected data 12 and a population of users 16 of the computer system 10 in order to ensure that only authorized users 16 access the protected data 12. Several example use cases are described below. The IE-KDF based protection function 14 may be implemented using software as described below. In operation, a user 16 supplies a secret password in the context of a request to access the protected data 12. The IE-KDF based protection function 14 calculates a derived key from the secret password, and uses the derived key along with other information to grant or deny access to the protected data 12. This request-time activity will generally have been preceded by an earlier process of applying password-based protection to the protected data, using the same secret password. The use of the same password at both times serves as an indicator of proper authorization of the requesting user 16 to access the protected data 12. Additional specifics are provided below.

Figure 2:
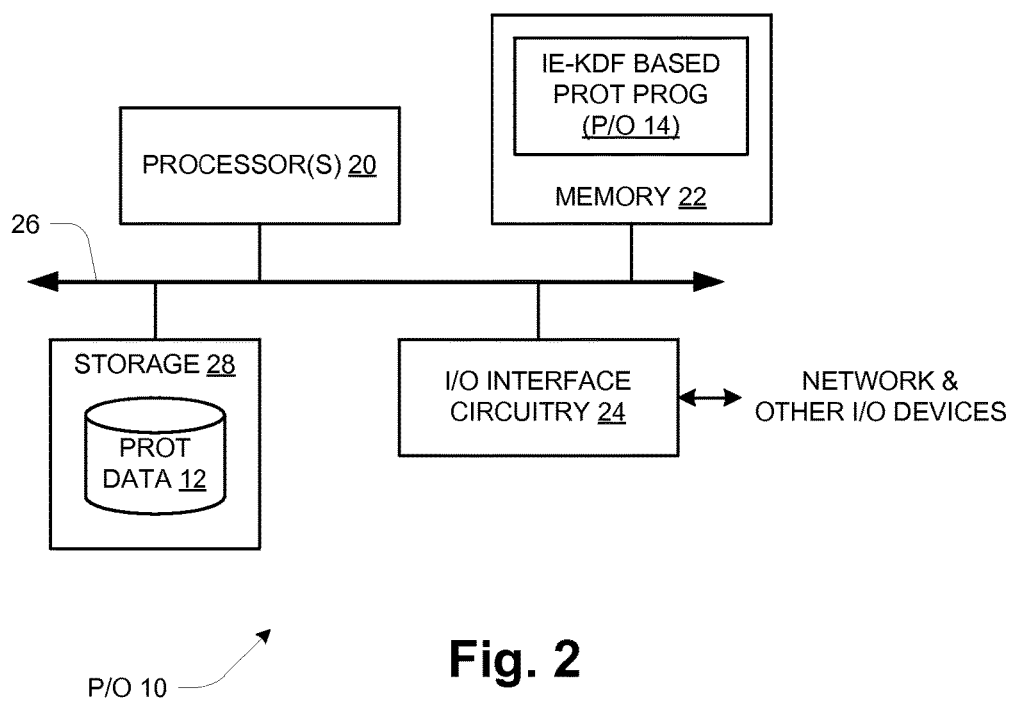
FIG. 2 is a block diagram of a computer from primarily a hardware perspective.

FIG. 2 shows an example configuration of a physical computer, which may be all or part of the computer system 10, from primarily a computer hardware perspective. The computer includes one or more processors 20, memory 22, and interface circuitry 24 interconnected by data interconnections 26 such as one or more high-speed data buses. The interface circuitry 24 provides a hardware connection to a network and perhaps other external devices/connections (EXT DEVs), which may include connections to the users 16 (FIG. 1). The processor(s) 20 with connected memory 22 may also be referred to as "processing circuitry" herein. There may also be local storage 28 such as a local-attached disk drive or Flash drive. In operation, the memory 22 stores data and instructions of system software (e.g., operating system) and one or more application programs which are executed by the processor(s) 20 to cause the hardware to function in a software-defined manner. Thus the computer hardware executing instructions of a data protection application, for example, can be referred to as a data protection circuit or data protection component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

In the illustrated example, the memory 22 stores computer program instructions executed by the processor(s) 20 to realize the IE-KDF based protection function 14. The protected data 12 resides in the storage 28. It will be appreciated that the protected data 12 may be stored in any of a variety of locations, including for example the memory 22 or other storage accessible via the I/O interface circuitry 24, such as a network-attached storage (NAS) device for example.

Figure 3:
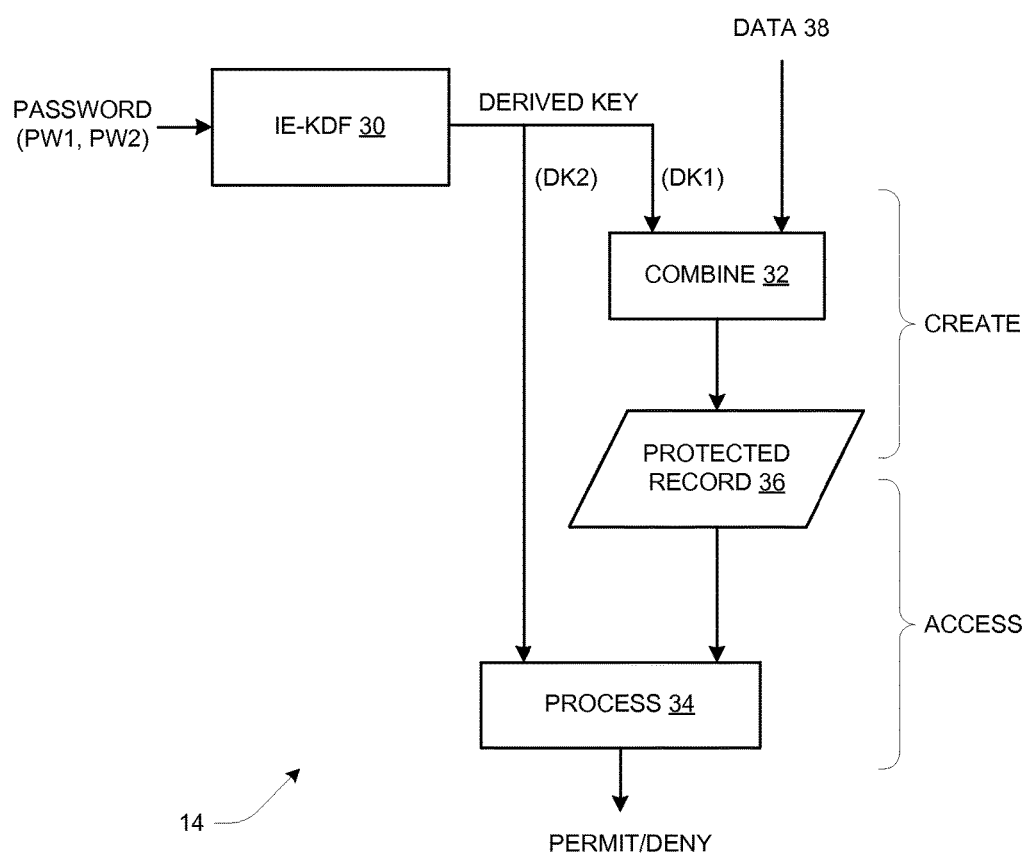
FIG. 3 is a functional block diagram of a method for protecting data using a key derivation function.

FIG. 3 illustrates the IE-KDF based protection function 14. It includes an iteration-enhanced key derivation function (IE-KDF) 30, a combining function (COMBINE) 32, and record-processing function (PROCESS) 34. The IE-KDF function 30 generates a derived key from a corresponding input password. In an example operation described below, a protected record 36 is created, stored, and later accessed, and derived keys DK1, DK2 are generated by the IE-KDF 30 from corresponding passwords PW1, PW2.

More specifically, during creation of the protected record 36 the IE-KDF 30 generates a first derived key DK1 from a first password PW1 that has been supplied as the password for password-protecting the protected record 36. The combining function 32 combines the first derived key DK1 with data 38 to be protected, and the result of this combining is saved as the protected record 36. At a later time when a user is attempting to access the protected record 36, the user again supplies a password, identified as the second password PW2. In the usual benign case, the second password PW2 is the same as the first password PW1, and thus the second derived key DK2 is the same as the first derived key DK2. In this case, the record-processing function 34 permits access to, and/or use of, the data 38 which is stored as part of the protected record 36. If the second password PW2 is not the same as the first password PW1, which is an indication that the attempted access is not by the authorized user, then the second derived key DK2 will not be the same as the first derived key DK1 (to a statistical certainty, as generally known in the art). Thus upon finding that DK1 and DK2 do not match, the record-processing function 34 prevents access to the data 38 which is stored as part of the protected record 36.

Figure 4:
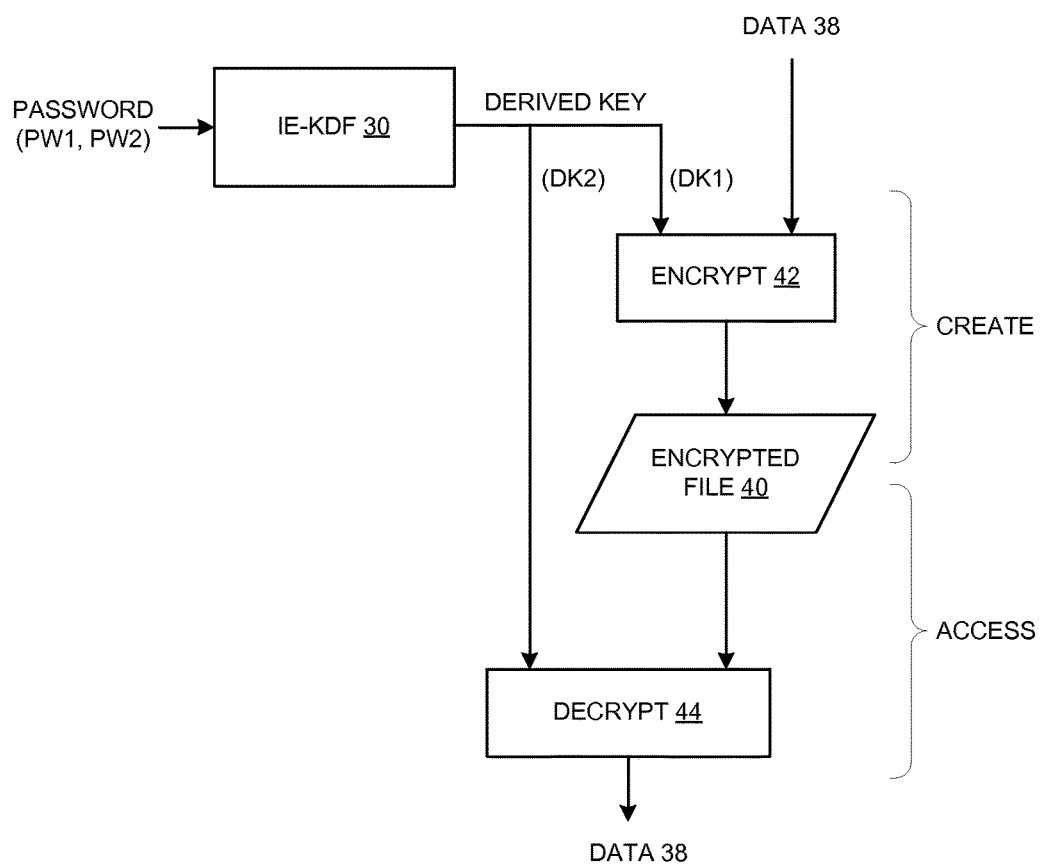
FIGS. 4 and 5 are functional block diagrams of specific applications of the general method of FIG. 3.
Figure 5:
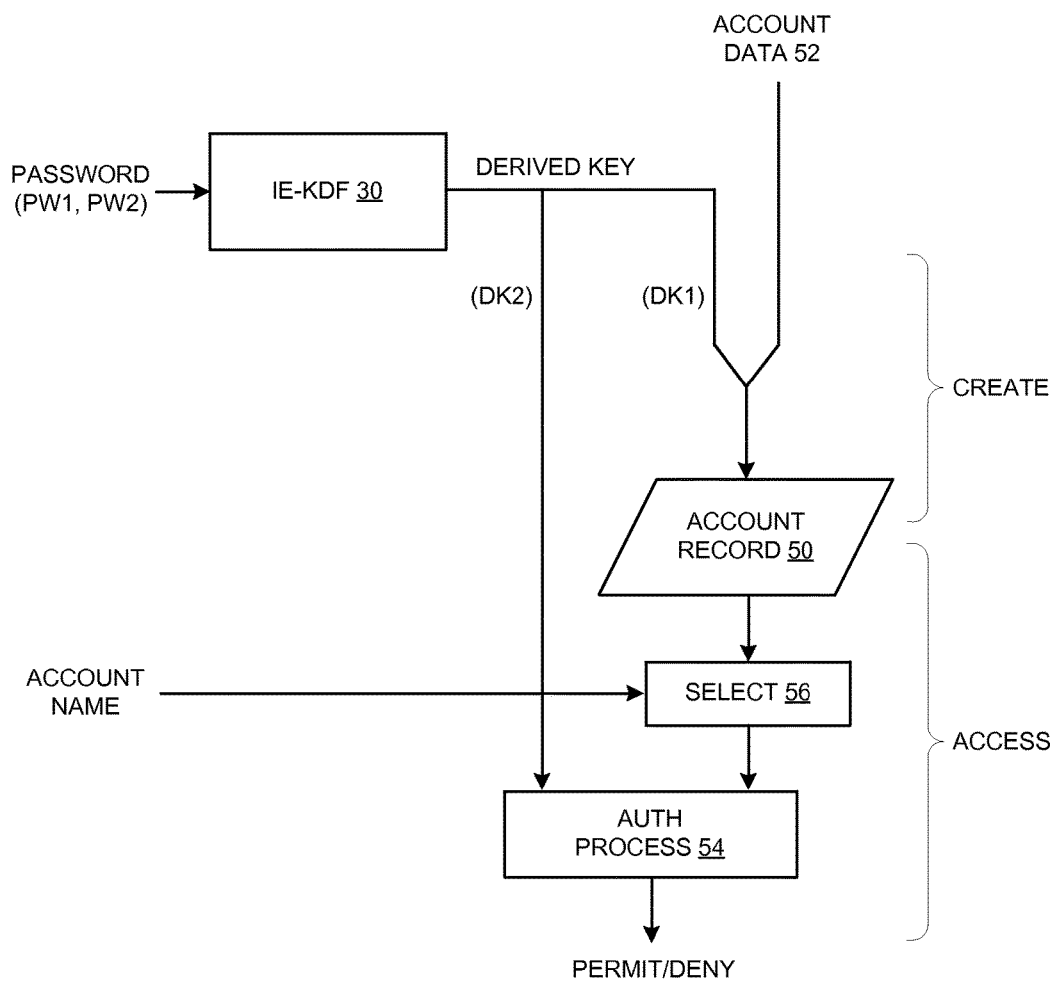

FIGS. 4 and 5 illustrate two specific versions of the general scheme of FIG. 3. These are described in turn.

FIG. 4 shows use of the technique in encrypting and decrypting a file, shown as encrypted file 40. In this use, the combining function 32 of FIG. 3 is an encryption function (ENCRYPT) 42 using the first derived key DK1, and the record-processing function 34 of FIG. 3 is a decryption function (DECRYPT) 44 using the second derived key DK2. The original data 38 is protected in the sense that its encrypted form in the file 40 is unintelligible to anybody lacking the correct password. Access is in the form of re-generating the original data 38 by successfully decrypting the encrypted file 40, which occurs when the second password PW2 matches the first password PW1, as described above.

FIG. 5 shows use of the technique in authenticating a user as an authorized user permitted to access resources of the computer system 10. In this case the protected record 36 of FIG. 3 is an account record 50 that includes a combination of a first derived key DK1 and other account data 52 for this authorized user, such as a username, personal identifying information (name, address, etc.), system privileges information, etc. In this case the account data 52 is protected in the sense that it does not serve as a credential or provide system access to anybody lacking the correct password. The first derived key DK1 is generated from a first password PW1 that may be created when a user account is first created or during an authorized password-change operation. The record-processing 34 of FIG. 3 is in the form of an authentication processing function 54 operating upon a second derived key DK2 and contents of the account record 50 (including stored derived key DK1), as selected by a selector 56 based on user input of a username or account name identifying an account that the user is trying to access. The second derived key DK2 is generated from a second password PW2 also presented by the user at the time of access. If the correct account is identified and the correct password PW2=PW1 is presented, then the second derived key DK2 matches the first derived key DK1 obtained from the account record 50. The authentication processing 54 compares these values, and upon finding a match deems the user authenticated and permits user access to the account and other system resources that the user is authorized to access (e.g., transaction data, financial data, etc.). If the values do not match, then the user is not so authenticated and is not permitted such access.

Figure 6:
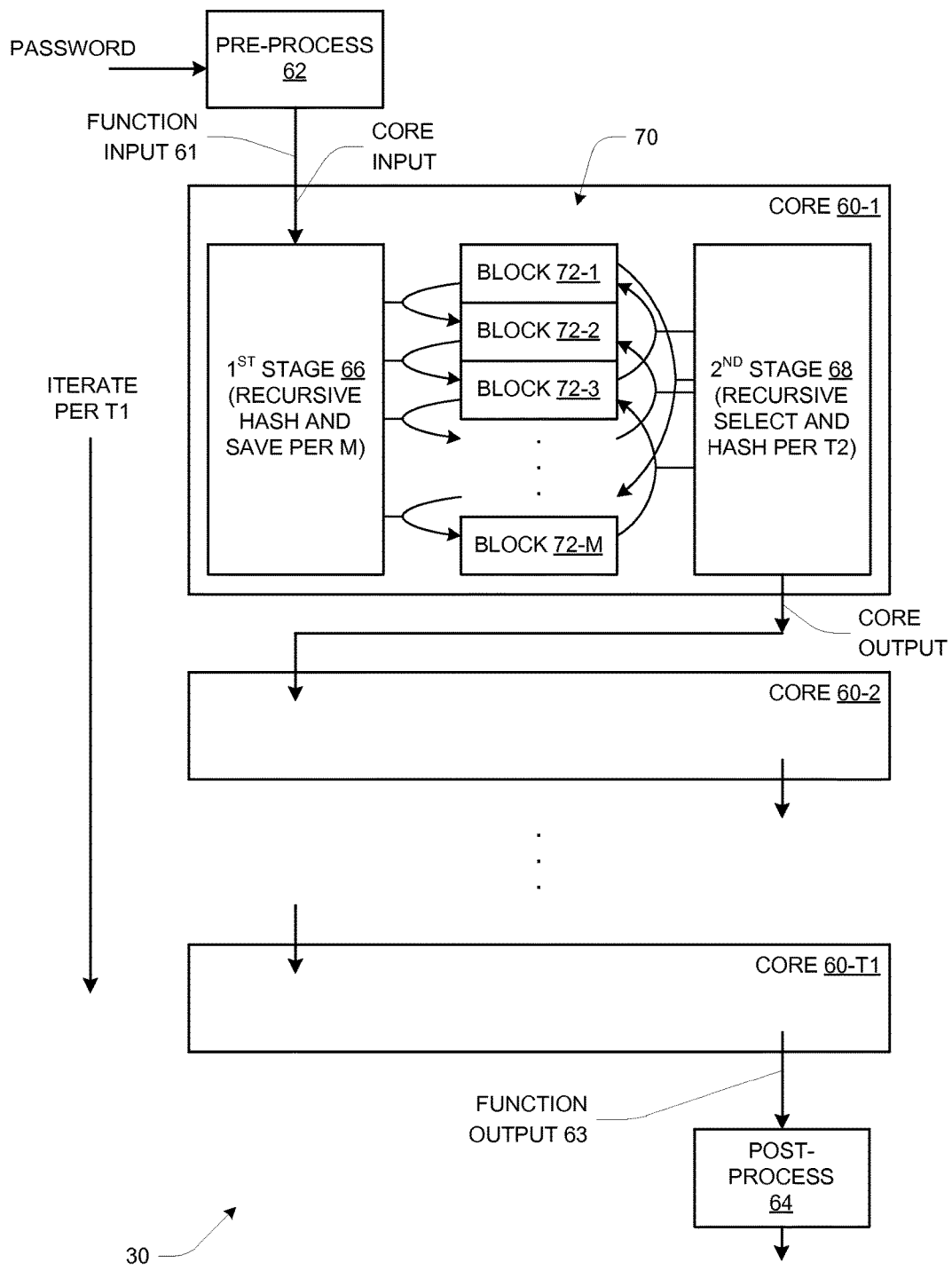
FIG. 6 is a functional block diagram depicting operation of a key derivation function.

FIG. 6 illustrates structure and operation of the IE-KDF 30. It includes sequential iterations of a core operation 60 (60-1, 60-2, . . . ), also referred to as a "core", with the number of iterations being specified by a first parameter T1. As shown, a core output generated by a given core 60-$i$ is taken as the core input for a next succeeding core 60-($i$+1). The input to the first core 60-1 is identified as a function input 61, and the output from the last core 60-T1 is identified as a function output 63. In typical use, an input password has pre-processing 62 applied to generate the function input 61, and the function output 63 may have post-processing 64 applied to generate the derived key serving as the overall output.

The core 60 includes first and second stages 66, 68 of processing. The first stage 66 produces an array 70 of memory blocks 72 (72-1, 72-2, . . . ) containing pseudorandom data by iterated block hashing operations, as described more below. The blocks 72 are of a fixed size generally a multiple of a "sub-block" size of an underlying hash method, as also described more below. It may be convenient for the block size to be the same as a memory page size. In one embodiment the blocks 72 have a size of 4K bytes. The size of the blocks 72 is referred to below by the name "BlockSize".

In the first stage 66, the blocks 72 are created in order beginning with first block 72-1 and proceeding linearly through to last block 72-M, where M is another specified parameter (along with T1 as mentioned above). The second stage 68 also performs iterated block hashing operations using the array 70, but begins with the last block 72-M and proceeds through additional blocks in a generally random way as described more below. The number of iterations performed by the second stage 68 is dictated by a third specified parameter, T2.

One of the major attributes of the IE-KDF 30 is its "hardness", i.e., resistance to cryptanalytic attack. This is provided in part by the technique of building the memory array 70 and beginning operation of the second stage 68 with the very last-created block 72-M. Thus it is required for the entire array 70 to be created and then remain in memory during the core operation 60. This characteristic can make it difficult for an attacker to mount a brute-force attack even if using highly parallel processing, because of the large amount of memory that would be required. Hardness is also affected by the values of the parameters T1 and T2, which together dictate a total number of iterations (T1*T2) and hence the amount of CPU time required for overall processing. Generally it is best if T2 is approximately equal to M. T1 can be used to tune overall processing time to a desired value while maintaining M and T2 as high as possible, maximizing hardness. One important feature, described more below, is that the hardness of existing derived keys can be increased by running additional iterations of the core 60, without requiring access to the respective input passwords. Thus as computer processing power increases over time, a set of derived keys previously created can be processed to generate a new set corresponding to a new and higher value of T1. Hardness can be increased to help offset increased computing power available to attackers.

Preprocessing 62 may include processing of the input password to generate a value usable as the function input 61 that is a normalized value conforming to input requirements of the core 60. For example, the password may be of arbitrary length, and the preprocessing 62 converts the password to the normalized value with fixed predetermined length conforming to the input requirements. In another example, the password may be character-based, and the preprocessing 62 converts the password to the normalized value with universal byte-oriented encoding such as UTF.

Preprocessing 62 may also include addition of a cryptographic salt in generating the value for the function input 62, where the salt includes a random component and a deterministic personalization component to maintain distinction between different applications or environments in which the same first password is used. This is described more below.

Postprocessing 64 may include processing to generate the derived key as a denormalized value conforming to input requirements of the combining 32 and the record processing 34. As an example, the value of the function output 63 may be of a normalized length greater than a key length of an encryption key to be used in encrypting and decrypting steps 42, 44, and the postprocessing 64 converts the value to the derived key having the necessary key length.

The following summarizes the above-mentioned parameters of the processing of FIG. 6:

1. Memory Factor MF:

A memory factor MF specifies the number of memory blocks $M=2^{MF}$ to be used in creating the array 70. A desirably high amount of memory should be used to execute the algorithm. In the year 2014, a desired amount is 1 MByte or more. Assuming a block size of 4K bytes, the corresponding value of M is 256 or greater, and the corresponding memory factor MF is 8 or greater.

2. Time Factor T1 (Outer Loop Parameter):

Time factor T1 is independent of M as well as T2. Higher values provide greater hardness. T1 can be used to increase hardness over time as available CPU power increases, without necessarily increasing M and/or T2. This feature can be exploited to re-process existing derived keys to harder values corresponding to greater values of T1, as described more below.

3. Time Factor T2 (Inner Loop Parameter):

Typically, time factor T2 is set equal to M. For a given overall time T1*T2, it is generally better to use a larger value of T2 and correspondingly smaller value of T1. For example, if a combination were under consideration that would require T1*T2=10,000, this could be achieved in a few different ways:

a. M=256, T2=256, T1=40
b. M=512, T2=256, T1=40
c. M=512, T2=512, T1=20

From a hardness perspective, the above alternatives would be ranked (c), (b), (a) from best to worst. (b) is better than (a) because it uses more memory, and (c) is better than (b) because it uses a higher value of T2 closer to the value of M (in this case equal to M).

4. Input Password:

This is the secret value being protected. In general it is of variable length, and it may be in the form of a character string. It is desired to apply the pre-processing 62 to convert the variable length value to a fixed length, and to convert characters to bytes. For the latter, a uniform encoding such as UTF-8 may be employed. An example of pre-processing with length conversion is given below.

5. Salt A cryptographic "salt" value is used to enhance randomness in the function input 61 that is subject to the IE-KDF processing. The purpose of the salt is to allow the generation of a large set of keys corresponding to each unique password, for fixed parameters. For a given password, the number of possible resulting distinct keys is approximately $2^{sLen}$, where sLen is the length of the salt in bits. Therefore, using a salt makes it difficult for the attacker to generate a table of resulting keys, for even a small subset of the most-likely passwords. In one embodiment, the salt value might include a deterministic personalization component along with the typical random component. For example, if a 128-bit random value is used, another value can be appended that is specific to the application, session, environment, etc. to help reduce interactions between such components. Salting is also performed in the pre-processing 62.

Overall, the use of the three separate parameters MF, T1 and T2 make the IE-KDF 30 desirably tunable so that applications can achieve desired performance and security (protection strength) goals.

Figure 7:
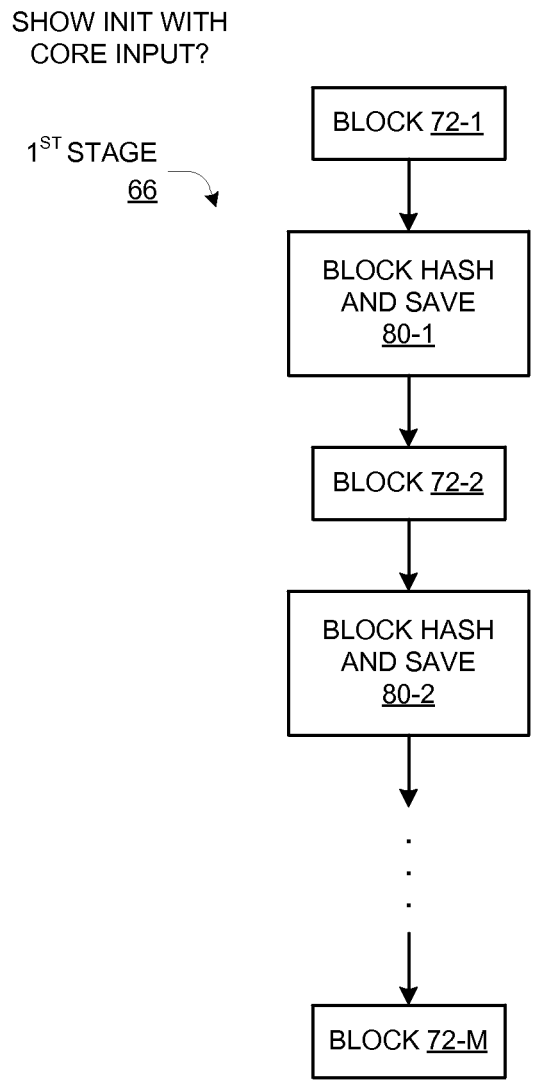
FIG. 7 is a flow diagram for operation of a first stage of the key derivation function.

FIG. 7 illustrates the processing of the first stage 66. As shown, it includes a series of iterations of a block hash and save function 80 (80-1, 80-2, . . . ) operating on successive blocks 72-1, 72-2, . . . . Thus a first iteration 80-1 operates on the first block 72-1 and generates a second block 72-2. The next iteration 80-2 operates on the second block 72-2 and generates 72-3. This process is repeated until the last block 72-M is generated.

This process can also be defined somewhat more formally as follows.

1. Define K as the memory array 72, whose size is BlockSize * M bytes, where BlockSize is the size of the blocks 72 as described above.

2. As a first step, the first block 72-1 is created. This can be done in a variety of ways. In one embodiment, a known KDF referred to as "PBKDF2" is used to create a starting block 72-1, which is referred to below as X1:

X1=PBKDF2(secret, real salt, iteration count=1, output size=BlockSize)

Append X1 to K where "secret" is the function input 61 (FIG. 6).

3. Then, the remainder of the blocks 72 of the array 70 are created. This uses the function BlockHash, which corresponds to the "block hash" part of the steps 80 and is described further below. In this description, each block 72-$i$ is referred to as Xi:

For i=2 to M:

Xi=BlockHash (X(i−1)) /creates block 72-$i$ from block 72-($i$−1)

Append Xi to K /adds new block 72-$i$ to array 70

Figure 8:
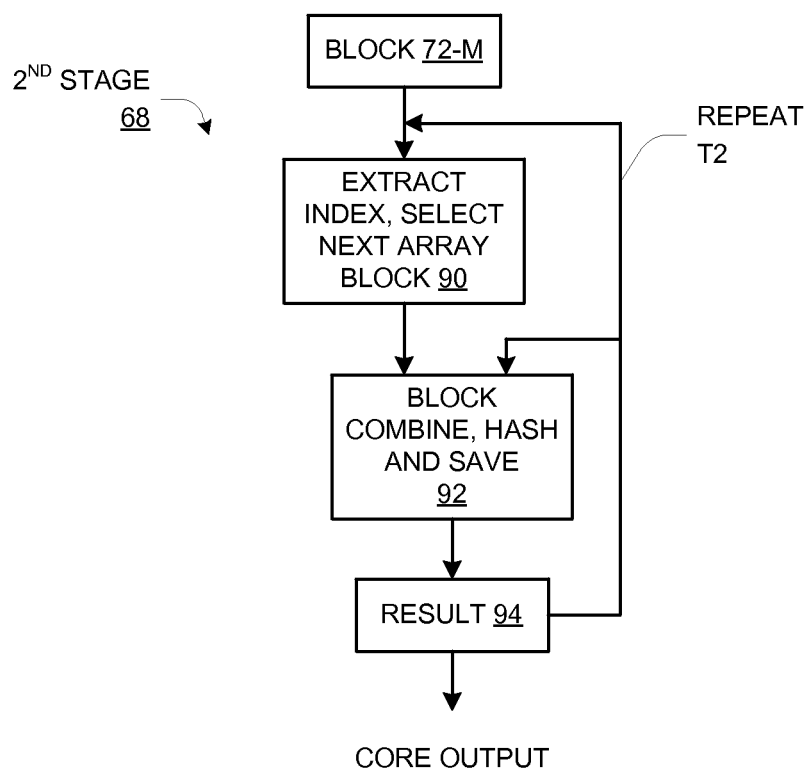
FIG. 8 is a flow diagram for operation of a second stage of the key derivation function.

FIG. 8 illustrates the processing of the second stage 68, which includes T2 iterations of steps 90-92. A first iteration operates on the last block 72-M and generates a first-iteration result 94. Each subsequent iteration is performed on the result 94 of the preceding iteration.

At 90, predefined bits of the block generated in the preceding iteration (block 72-M in first iteration, result 94 in subsequent iterations) are selected and used as an index identifying a next block 72 within the array 70. At 92, a set of operations identified as block combine, hash and save are performed using both the identified next block 72 as well as the block from the preceding iteration (block 72-M in first iteration, result 94 in subsequent iterations). The result of the operations at 92 at each iteration is an updated result 94, i.e., the new result value replaces the result value from the preceding iteration. When the last iteration is completed, the result 94 is taken as the core output of the core operation 60 (FIG. 6).

This process can also be defined somewhat more formally as follows, again using K to refer to the array 70. This description identifies the block being operated on in each iteration j as block Yj.

Begin with the last block 72-M, which is also identified as Y1, and repeatedly access and hash blocks of K into successive results Yj:

For j=2 to T2:

Get lowest log 2(M) bits of block Y(j−1) and convert value to Index

Temp=K [Index] XOR Y(j−1)

Y(j)=BlockHash(Temp)

The final output (core output) may be produced by hashing from BlockSize down to the size of the underlying hash function Hash( ) which is described further below:

core-output=Hash(Y(T2))

As mentioned above, the process uses an underlying secure hash function of a given size that is typically a sub-multiple of the memory page size. At present, a good candidate hash function is SHA-256, which operates on 256-byte data units; these are referred to as "sub-blocks" herein. In general, a block 72 is made up of R sub-blocks of the size of the hash function. Thus in the case of 4K-byte blocks 72 and SHA-256 as the hash function, a block 72 contains 16 sub-blocks.

Figure 9:
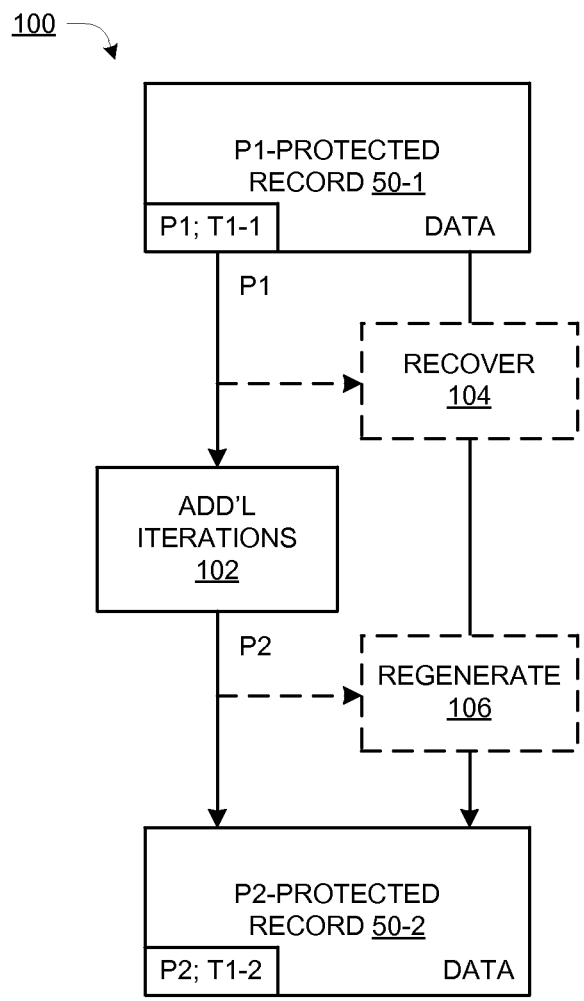
FIG. 9 is a functional block diagram depicting additional execution of the key derivation function using previously created derived keys to increase protection strength.

The following describes the BlockHash operation used in the core operation 60 as described above:
1. Divide block 72 into sub-blocks the size of the underlying hash algorithm (for SHA256: 32 bytes)
Starting Y=last (highest ordered) sub block
For each of the R sub-blocks:
Y=sub-block XOR Y
Y=hash(Y)
Z=Z.append Y
Mix blocks:
Even indexed sub-blocks are moved to first half of output
Odd indexed sub-blocks are moved to last half of output FIG. 9 illustrates a process 100 of further hardening an existing derived key P1 that was created using the IE-KDF 60 with a first value T1-1 of the parameter T1. In particular, there is a P1-protected record 50-1 that includes user content, the derived key P1, and the first T1 value T1-1. The user content is represented as "Data".

At 102, the value P1 is used as input to additional iterations of the core 60, up to a new T1 value T1-2. As an example, if T1-1 is 20 and it is desired to increase the hardening to a T1-2 of 30, then 10 additional iterations (30–20) are performed at 102. The output at 102 is a new derived key P2, which along with the value T1-2 is stored as part of a P2-protected record 50-2 having the same user content ("Data") as the P1-protected record 50-1.

It may or may not be necessary to also update the data that represents the user content, depending on whether the data depends on the value of the key Px that protects it. Referring to the above example of an account record 50, the data may just be stored in association with P1 but not depend upon its specific value. In that case, the data is just maintained or copied over as necessary in creating the P2-protected record 50-2. If the data in the record 50-1 is dependent on the value of P1, then it may be necessary to recover the original data in a recovery step 104 using P1 and use the output to generate a new form of the data in a regenerate step 106 using P2. Referring to the above encryption example, the recovering at 104 corresponds to decrypting the data in record 50-1 using P1, and the regenerating at 106 corresponds to re-encrypting using P2, with the result being saved as the data in the record 50-2.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computer to protect digital data stored therein, comprising:
in a first operation, receiving a first input password and applying a key derivation function to a first value of a function input to generate a first derived key as a first value of a function output, the first value of the function input being equal to or derived from the first input password, and combining by, a hardware processor, the first derived key with the digital data to generate a protected record stored in the computer; and
in a subsequent second operation, receiving a second input password and applying the key derivation function to a second value of the function input to generate a second derived key as a second value of the function output, the second value of the function input being equal to or derived from the second input password, and processing the protected record using the second derived key to selectively permit user access to the digital data when the second derived key matches the first derived key;
wherein applying the key derivation function includes performing a first predetermined number of iterations of a two-stage core hashing operation, a first stage of the core hashing operation including creating an ordered array of initialized memory blocks by recursive block hashing and saving beginning with a first memory block created by first hashing of a core input value, the ordered array including a last-created memory block and having a size equal to a second predetermined number of memory blocks, a second stage of the core hashing operation including creating a core output value by recursive block selecting and block hashing beginning with the last-created memory block, successive recursions selecting from among blocks of the ordered array of initialized memory blocks according to contents of respective hashed block results of respective immediately preceding recursions, the iterations of the two-stage core hashing operation including (1) a first iteration with the function input being taken as the core input value, (2) a last iteration with the core output value being taken as the function output, and (3) one or more intermediate iterations with the core input value being the core output value from a respective immediately preceding iteration and the core output value being the core input value to a respective immediately succeeding iteration.

2. A method according to claim 1, wherein the first predetermined number is a first time parameter T1 independent of the second predetermined number, and wherein the recursive block selecting and block hashing is performed a third predetermined number of times, the third predetermined number being dependent on the second predetermined number.

3. A method according to claim 2, wherein the third predetermined number is in a range from one half to three halves of the second predetermined number.

4. A method according to claim 1, wherein (1) the protected record is an encrypted file containing an encrypted form of the digital data, (2) the combining includes encrypting the digital data using the first derived key to generate the encrypted form of the digital data for storing in the encrypted file, and (3) the processing of the protected record includes decrypting the encrypted file using the second derived key to obtain the digital data in non-encrypted form.

5. A method according to claim 1, wherein (1) the protected record is an account record containing account data enabling user access to resources of the computer, (2) the combining includes storing the first derived key in the account record, and (3) the processing of the protected record includes (a) comparing the second derived key to the first derived key in the account record to determine whether they match, and (b) only if the second derived key is determined to match the first derived key in the account record, then enable a user providing the second password to access the resources of the computer according to the account data in the account record.

6. A method according to claim 5, wherein the computer is located remotely from a user terminal that receives the second password and converts it into the second derived key for transmission to the computer over a communications link, and further including receiving the second derived key from the user terminal via the communications link.

7. A method according to claim 1, wherein the first and second operations are performed during a first period of use of the first password and provide a first strength in obscuring the first password by generating and using the first derived key, the first strength associated with the first predetermined number, and further including third and fourth operations performed during a subsequent second period of use of the first password to provide a second higher strength in obscuring the first password by generating and using a third derived key, the second strength associated with the sum of the first predetermined number and a third predetermined number, the third operation (1) applying the key derivation function to a third value of the function input to generate the third derived key as a third value of the function output, the third value of the function input being equal to or derived from the first derived key, the key derivation function performing the third predetermined number of iterations of the two-stage core hashing operation, and (2) creating a new version of the protected record using data contents of the protected record and the third derived key, the fourth operation (3) applying the key derivation function to a fourth value of the function input to generate a fourth derived key as a fourth value of the function output, the fourth value of the function input being equal to or derived from a third input password, the key derivation function performing the third predetermined number of iterations of the two-stage core hashing operation, and (4) processing the new version of the protected record using the fourth derived key to selectively permit user access to the digital data when the fourth derived key matches the third derived key.

8. A method according to claim 1, wherein the first and second operations include preprocessing of the first and second input passwords to generate the first and second values respectively of the function input, the preprocessing generating the first and second values as normalized values conforming to input requirements of the two-stage core hashing operation.

9. A method according to claim 8, wherein the first and second passwords are both of arbitrary length, and the preprocessing converts the first and second passwords to the first and second values with fixed predetermined length conforming to the input requirements.

10. A method according to claim 8, wherein the first and second passwords are character-based, and the preprocessing converts the first and second passwords to the first and second values with universal byte-oriented encoding.

11. A method according to claim 8, wherein the preprocessing includes addition of a cryptographic salt in generating the first and second values of the function input, the salt including a random component and a deterministic personalization component to maintain distinction between different applications or environments in which the same first password is used.

12. A method according to claim 1, wherein the first and second operations include postprocessing of the first and second values of the function output to generate the first and second derived keys respectively, the preprocessing generating the first and second derived keys as denormalized values conforming to input requirements of the combining and the protected-record processing.

13. A method according to claim 12, wherein the first and second values of the function output are of a normalized length greater than a key length of an encryption key to be used in the combining and protected-record processing, and the postprocessing converts the first and second values to the first and second derived keys having the key length.

14. A method according to claim 1, wherein the two-stage core hashing operation employs a hash algorithm of a size corresponding to a sub-block of the blocks of the ordered array of initialized memory blocks, the hash algorithm being repeated across the sub-blocks of the blocks in the iterations of the two-stage core hashing operation.

15. A method according to claim 1, wherein the computer includes general-purpose computing circuitry and specialized computing circuitry providing for accelerated computation of the hash algorithm, the general-purpose computing circuitry being used to perform the method except for computation of the hash algorithm which is performed by the specialized computing circuitry.

16. A method according to claim 1, wherein the hash algorithm is one hash algorithm of a set of distinct hash algorithms executable by the computer, and further including (1) receiving an input specifying the one hash algorithm to be used in the method, and (2) selecting the one hash algorithm and using it in the method based on the input.

17. A method according to claim 1, wherein the selecting from among blocks of the ordered array of initialized memory blocks according to contents of respective hashed block results of respective immediately preceding recursions includes (1) extracting bits of the respective hashed block results to form an index, and (2) selecting a next block of the ordered array based on the index.

18. A computer, comprising:
one or more hardware processors;
memory;
input/output interface circuitry; and
interconnection circuitry interconnecting the processors, memory and input/output interface circuitry together for data transfer therebetween,
the memory storing computer program instructions that, when executed by the processors, cause the computer to perform a method of protecting digital data stored therein, the method including:
in a first operation, receiving a first input password and applying a key derivation function to a first value of a function input to generate a first derived key as a first value of a function output, the first value of the function input being equal to or derived from the first input password, and combining the first derived key with the digital data to generate a protected record stored in the computer; and
in a subsequent second operation, receiving a second input password and applying the key derivation function to a second value of the function input to generate a second derived key as a second value of the function output, the second value of the function input being equal to or derived from the second input password, and processing the protected record using the second derived key to selectively permit user access to the digital data when the second derived key matches the first derived key;
wherein applying the key derivation function includes performing a first predetermined number of iterations of a two-stage core hashing operation, a first stage of the core hashing operation including creating an ordered array of initialized memory blocks by recursive block hashing and saving beginning with a first memory block created by first hashing of a core input value, the ordered array including a last-created memory block and having a size equal to a second predetermined number of memory blocks, a second stage of the core hashing operation including creating a core output value by recursive block selecting and block hashing beginning with the last-created memory block, successive recursions selecting from among blocks of the ordered array of initialized memory blocks according to contents of respective hashed block results of respective immediately preceding recursions, the iterations of the two-stage core hashing operation including (1) a first iteration with the function input being taken as the core input value, (2) a last iteration with the core output value being taken as the function output, and (3) one or more intermediate iterations with the core input value being the core output value from a respective immediately preceding iteration and the core output value being the core input value to a respective immediately succeeding iteration.

19. A non-transitory computer-readable medium storing computer program instructions, the instructions being executable by a computer to cause the computer to perform a method of protecting digital data stored therein, the method including:
    in a first operation, receiving a first input password and applying a key derivation function to a first value of a function input to generate a first derived key as a first value of a function output, the first value of the function input being equal to or derived from the first input password, and combining the first derived key with the digital data to generate a protected record stored in the computer; and
    in a subsequent second operation, receiving a second input password and applying the key derivation function to a second value of the function input to generate a second derived key as a second value of the function output, the second value of the function input being equal to or derived from the second input password, and processing the protected record using the second derived key to selectively permit user access to the digital data when the second derived key matches the first derived key;
    wherein applying the key derivation function includes performing a first predetermined number of iterations of a two-stage core hashing operation, a first stage of the core hashing operation including creating an ordered array of initialized memory blocks by recursive block hashing and saving beginning with a first memory block created by first hashing of a core input value, the ordered array including a last-created memory block and having a size equal to a second predetermined number of memory blocks, a second stage of the core hashing operation including creating a core output value by recursive block selecting and block hashing beginning with the last-created memory block, successive recursions selecting from among blocks of the ordered array of initialized memory blocks according to contents of respective hashed block results of respective immediately preceding recursions, the iterations of the two-stage core hashing operation including (1) a first iteration with the function input being taken as the core input value, (2) a last iteration with the core output value being taken as the function output, and (3) one or more intermediate iterations with the core input value being the core output value from a respective immediately preceding iteration and the core output value being the core input value to a respective immediately succeeding iteration.

\* \* \* \* \*